(12) United States Patent
Robinson et al.

(10) Patent No.: US 12,427,871 B2
(45) Date of Patent: Sep. 30, 2025

(54) SYSTEMS AND METHODS FOR OPERATING A DIVIDED POWER DISTRIBUTION SYSTEM

(71) Applicant: Caterpillar Inc., Peoria, IL (US)

(72) Inventors: Mark Andrew Robinson, Davis Junction, IL (US); Corey Allen Kauk, Elk River, MN (US); Michael John Barngrover, Brimfield, IL (US); Steven Robert Krause, Chillicothe, IL (US); Ben Evans, Peoria, IL (US); Keith Nicholas Edward Troisi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 165 days.

(21) Appl. No.: 18/491,681

(22) Filed: Oct. 20, 2023

(65) Prior Publication Data

US 2025/0128611 A1      Apr. 24, 2025

(51) Int. Cl.
| | |
|---|---|
| *B60L 50/60* | (2019.01) |
| *B60K 1/02* | (2006.01) |
| *B60L 1/00* | (2006.01) |
| *B60R 16/023* | (2006.01) |

(52) U.S. Cl.
CPC ............. *B60L 50/60* (2019.02); *B60K 1/02* (2013.01); *B60L 1/003* (2013.01); *B60R 16/0238* (2013.01); *B60L 2200/40* (2013.01)

(58) Field of Classification Search
CPC ....... B60L 50/60; B60L 1/003; B60L 2200/40
USPC ...................................................... 307/10.1
See application file for complete search history.

(56) References Cited

U.S. PATENT DOCUMENTS

| | | |
|---|---|---|
| 6,683,771 B2 | 1/2004 | Foch |
| 2019/0081475 A1 | 3/2019 | Strandberg |
| 2019/0115752 A1 | 4/2019 | Saunders |
| 2022/0024324 A1 | 1/2022 | Sopko, Jr. et al. |
| 2022/0344968 A1 | 10/2022 | Schildt et al. |

FOREIGN PATENT DOCUMENTS

| | | |
|---|---|---|
| CN | 211151584 U | 7/2020 |
| EP | 3572269 B1 | 10/2021 |
| EP | 3919310 A1 | 12/2021 |
| WO | 2023183615 A1 | 9/2023 |

OTHER PUBLICATIONS

Written Opinion and International Search Report for Int'l. Patent Appln. No. PCT/US2024/045762, mailed Jan. 7, 2025 (16 pgs).

*Primary Examiner* — Daniel Kessie
*Assistant Examiner* — Dru M Parries
(74) *Attorney, Agent, or Firm* — Lee & Hayes

(57) ABSTRACT

A work machine using a direct current power system that isolates reactive loads is described herein. The work machine uses a machine power distribution unit that receives direct current power from two or more battery banks of a power unit, whereby each of the battery banks deliver electrical power on a separate direct current bus. A machine power distribution unit of the work machine receives the electrical power from the battery and is used to isolate the power using bus connectors. One of the battery banks provides power to one direct current bus of the work machine and another battery bank provides power to another direct current bus of the work machine. A reactive load serviced by one of the battery banks is electrically disconnected from another reactive load serviced by the other battery bank.

17 Claims, 11 Drawing Sheets

SYSTEMS AND METHODS FOR OPERATING A DIVIDED POWER DISTRIBUTION SYSTEM

TECHNICAL FIELD

The present disclosure relates to a power distribution system used on a heavy work machine. More specifically, the present disclosure relates to using a power distribution unit to change modes of the power distribution system.

BACKGROUND

Heavy work machines, such as earth-moving vehicles or hauling trucks, require significant power to carry out their functions. The machines themselves can be of substantial weight, and their loads require large amounts of power to move. Diesel engines have been used to provide that power, but they can have disadvantages. However, the use of combustion engines in enclosed mining spaces can present several challenges. For example, the exhaust from combustion engines needs to be effectively removed from underground routes in order to maintain an atmosphere hospitable to workers and reduce the addition of pollutants into the ground and the atmosphere. Further, these machines are used to move large loads of material along underground and above-ground haul routes over large distances. Supplies of diesel fuel may be far away from such locations or not easily delivered to such locations.

Electrical power has been used to supplement or replace diesel engines in these mining machines. In some environments, the electrical power is delivered from one or more batteries. The batteries are used to provide power to various electrical equipment in the work machine. For example, the batteries can provide power to equipment such as, but not limited to, electric motors for rotating the work machine wheels, inverters for converting the battery power to various other forms of electrical power, electrical pumps, pumps for hydraulic systems, and the like. These batteries can be charged while installed on the machine if a suitable connection and power source are available. In other examples, the batteries can be swapped whereby a discharged battery is removed and a charged battery is installed.

SUMMARY

In an aspect of the presently disclosed subject matter, a work machine direct current power system includes a power unit comprising a first battery bank configured to output direct current power on a first direct current bus, a second battery bank configured to direct current power on a second direct current bus, a machine power distribution unit, comprising: a first bus connector that when in an open configuration electrically disconnects the first direct current bus from a third direct current bus and when in a closed configuration electrically connects the first direct current bus to the third direct current bus, wherein the third direct current bus services a first reactive load of the work machine when the first bus connector is in the closed configuration, a second bus connector that when in an open configuration electrically disconnects the second direct current bus from a fourth direct current bus and when in a closed configuration electrically connects the second direct current bus to the fourth direct current bus, wherein the fourth direct current bus services a second reactive load of the work machine when the second bus connector is in the closed configuration.

In a further aspect of the presently disclosed subject matter, a controller for a work machine direct current power system includes a first memory storing computer-executable instructions, and a first processor in communication with the memory, the computer-executable instructions causing the first processor to perform acts comprising placing the direct current power system in an operational mode by opening a first bus connector to electrically disconnect a first direct current bus from a second direct current bus, thereby electrically disconnecting a first reactive load of the work machine from a second reactive load of the work machine, closing a second bus connector to electrically connect a first battery bank of a power unit to the first direct current bus to provide power to the first reactive load of the work machine; and closing a third bus connector to electrically connect a second battery bank of the power unit to the second direct current bus to provide direct current power to the second reactive load of the work machine.

In an additional aspect of the presently disclosed subject matter, a direct current power system includes a power system mode, wherein in the power system mode a first bus connector is open to electrically disconnect a first direct current bus from a second direct current bus, thereby electrically disconnecting a first reactive load of the work machine from a second reactive load of the work machine, a second bus connector is closed to electrically connect a first battery bank of a power unit to the first direct current bus to provide power to the first reactive load of the work machine, and a third bus connector is closed to electrically connect a second battery bank of the power unit to the second direct current bus to provide direct current power to the second reactive load of the work machine, and a reduced power mode whereby a secondary battery provides direct current power, wherein in the reduced power mode the first bus connector is closed to electrically connect the first direct current bus to the second direct current bus, wherein the secondary battery provides direct current power to a converter, and wherein the converter provides direct current power to the second direct current bus, the second bus connector open to electrically disconnect the first battery bank from the first direct current bus, and the third bus connector is open to electrically disconnect the second battery bank from the second direct current bus, wherein in the reduced power mode the secondary battery provides direct current power to the first reactive load and the second reactive load.

DETAILED DESCRIPTION

Figure 1:
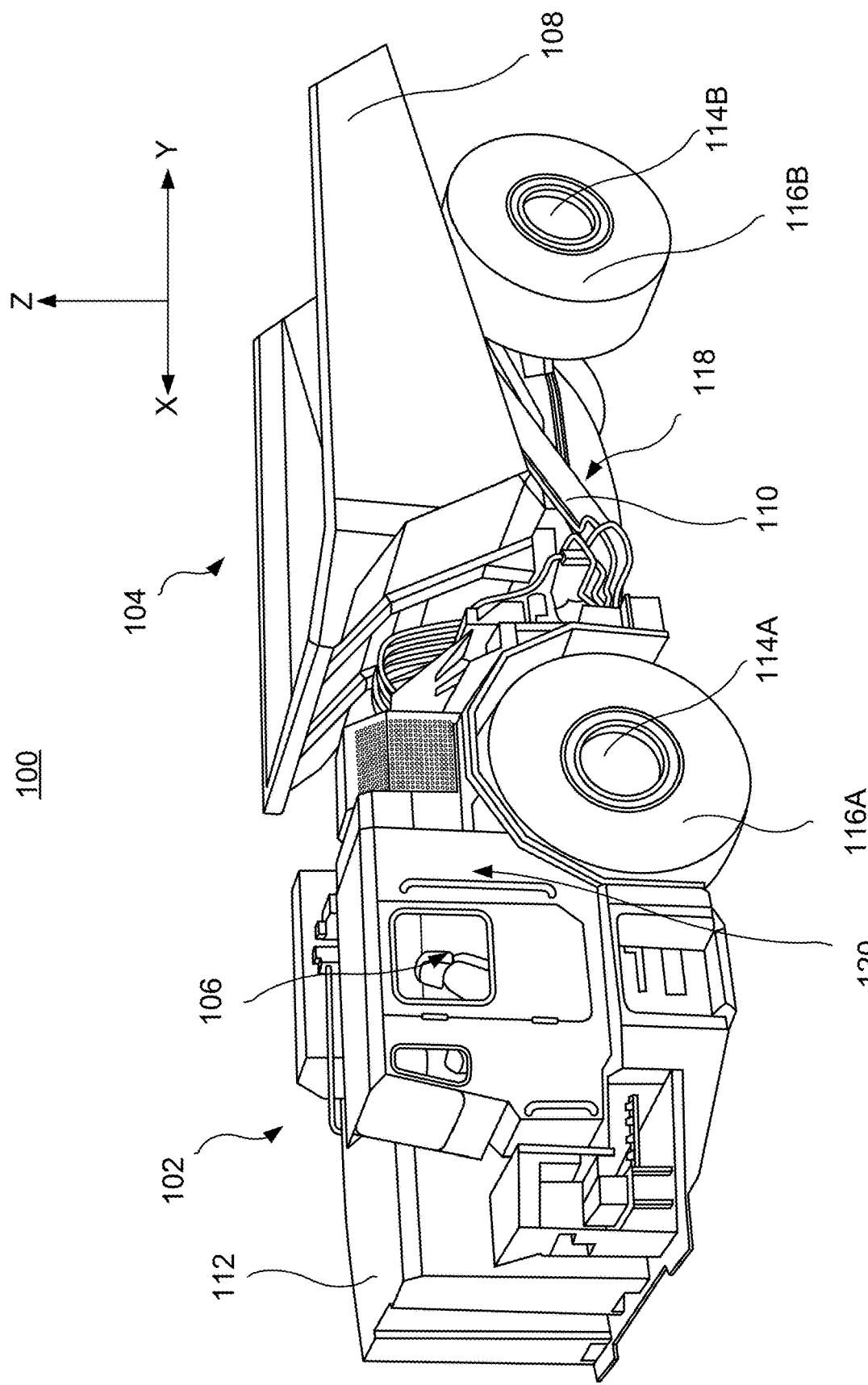
FIG. 1 illustrates an isometric view of a work machine within an XYZ coordinate system as one example suitable for carrying out the principles discussed in the present disclosure.

Wherever possible, the same reference numbers will be used throughout the drawings to refer to same or like parts. FIG. 1 illustrates an isometric view of a work machine 100 within an XYZ coordinate system as one example suitable for carrying out the principles discussed in the present disclosure. The exemplary work machine 100 travels along a mining route, typically from a source to a destination within a worksite. In one implementation as illustrated, work machine 100 is a hauling machine that hauls a load within or from a worksite within an underground mining operation. For instance, the work machine 100 can haul excavated ore or other earthen materials from an excavation area to dump sites and then return to the excavation area. In this arrangement, the work machine 100 is one of many similar machines configured to ferry earthen material in a trolley arrangement.

While a large, underground mining truck in this instance, the work machine 100 is any machine that carries a load between different locations within a worksite, examples of which include an articulated truck, an off-highway truck, an on-highway dump truck, a wheel tractor scraper, or any other similar machine. Alternatively, the work machine 100 is an off-highway truck, on-highway truck, a dump truck, an articulated truck, a loader, an excavator, a pipe layer, or a motor grader. In other implementations, the work machine 100 need not haul a load and can be any machine associated with various industrial applications including, but not limited to, mining, agriculture, forestry, construction, and other industrial applications.

Referring to FIG. 1, an example work machine 100 includes a front section 102 and a rear section 104. In some examples, the front section 102 is movably connected to the rear section through an articulating connector, not shown, but illustrated in more detail in FIG. 2, below. In some examples, the front section 102 and the rear section 104 are independently movable in multiple axis of rotation, allowing the front section 102 a degree of movement independent of the rear section 104, explained in more detail in FIG. 7, below. The work machine 100 further includes a cab 106. The cab 106 can be a climate-controlled, interior space in which one or more operators of the work machine 100 occupies during the operation of the work machine 100. The work machine further includes a bucket 108 installed at the rear section 104 of the work machine 100. The bucket 108 is used as the volume in which mined material or other material may be placed for transport. The bucket 108 is raised and lowered using hydraulic pistons, an example of which is illustrated in FIG. 1 as piston 110.

The work machine 100 further includes a power unit 112 that provides power to various electrical equipment of the work machine 100. The power unit 112 houses one or more set or assemblies of batteries (not illustrated), described in more detail in FIG. 2, below. The power unit 112 provides electrical power to wheel assemblies, such as a front wheel assembly 114A and a rear wheel assembly 114B, with complimentary wheel assemblies on the other side of the work machine 100 not shown. The wheel assemblies 114A and 114B are comprised of electrical motors that receive power from the power unit 112 through one or more inverters, described in more detail in FIG. 2. The inverters convert the direct current power provided by the batteries in the power unit 112 into alternating current used by the electrical motors of the wheel assemblies 114A and 114B. The polarity and power provided by the inverters to the wheel assemblies 114A and 114B causes the electrical motors of the wheel assemblies 114A and 114B to rotate, thereby rotating tires 116A and 116B respectively. In some examples, the wheel assemblies 114A and 114B receive power independently. For example, the wheel assembly 114A receives power from an inverter located in the front section 102, while the wheel assembly 114B receives power from an inverter located in the rear section 104. Additionally, a wheel assembly in one section, such as the front section 102 or the rear section 104, is powered independently of the complimentary wheel section in the same section. In this manner, each wheel assembly is operated independently of each other.

In some examples, the power unit 112 is unavailable for use. For example, in some configurations of the work machine 100, the power unit 112 is removable. In other examples, the power unit 112 is discharged to a degree that the power unit 112 cannot provide power at a required level. Another example is a situation in which the power unit 112 is damaged or otherwise electrically disconnected from the work machine 100. In the examples during which the power unit 112 is unavailable for use, a secondary battery 118 is used. In some examples, the secondary battery 118 is used to move the work machine 100 along a haul route by providing electrical power to wheel assemblies 114A and 114B. In still further examples, the secondary battery 118 provides power to other electrical loads, such as, but not limited to, a heating, cooling and ventilation (HVAC) system 120. The HVAC system 120 is used to heat or cool air within the cab 106. In some examples, the secondary battery 118 is used to supplement or augment electrical power provided by the power unit 112 in certain conditions, such as when the power unit 112 is fully discharged and is being changed out for a fully charged the power unit 112. Additional electrical and mechanical systems powered by the power unit 112 and/or the secondary battery are illustrated in FIG. 2, below.

Figure 2:
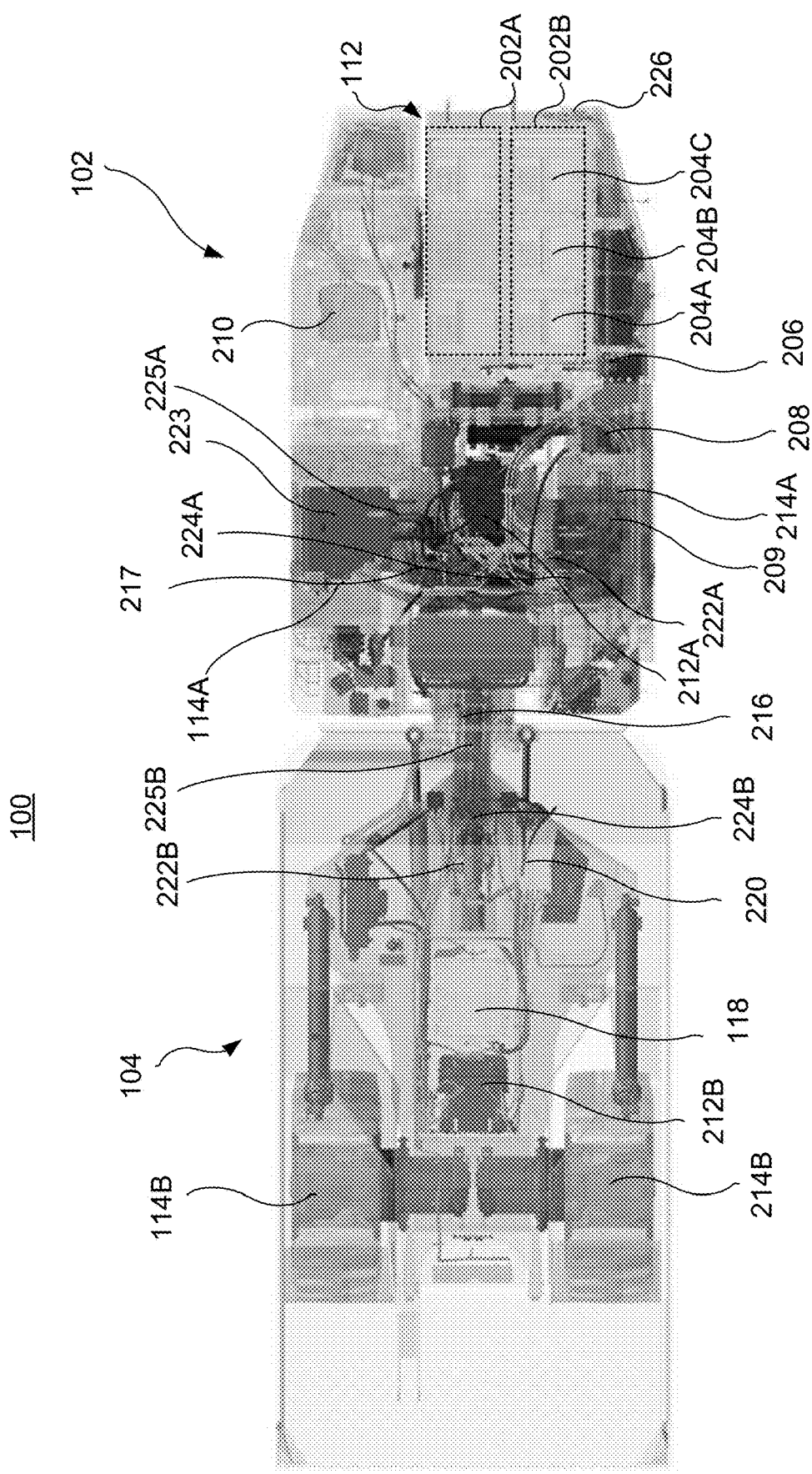
FIG. 2 is a top-down illustration of a work machine, in accordance with one or more examples of the present disclosure.

FIG. 2 is a top-down illustration of the work machine 100, in accordance with one or more examples of the present disclosure. As described above, electrical power to the work machine 100 is provided primarily by the power unit 112. The power unit 112 includes one or more batteries mechanically separated into one or more battery banks, illustrated as battery bank 202A and battery bank 202B. The battery bank 202A and the battery bank 202B include one or more batteries, illustrated by way of example as battery 204A, 204B, and 204C (referred to hereinafter individually as "the battery 204A," "the battery 204B," and "the battery 204C," and collectively as "the batteries 204"). In some examples, the power unit 112 includes other systems used to monitor, control the temperature of, and control various functions of the power unit 112 not described herein. The batteries 204, in some examples, collectively provide relatively high direct current potential.

Electrical power from the power unit 112 is delivered to various equipment through power interface 206. The power interface 206 includes electrical connectors to connect the power unit 112 to various systems of the work machine 100 not included as a component of the power unit 112. An example of the power interface 206 is described in more detail in FIGS. 6 and 7. An example of equipment powered by the power unit 112 is equipment that requires a voltage lower than the voltage output of the power unit 112. In these examples, a low voltage converter 208 is provided. In some examples, the low voltage converter 208 steps down the voltage of the power unit 112 to a lower voltage, such as, but not limited to, 24V. A low voltage battery 210 is used to store power generated by the low voltage converter 208 as well as act as a battery for equipment operating at the lower voltage. The electrical power provided by the low voltage converter 208 is distributed using a power distribution unit 209. In some examples, the power distribution unit 209 receives power from the low voltage converter 208 and distributes that power to the equipment operating at the lower voltage. It should be noted that, as with other equipment described herein, more than one low voltage converter and low voltage battery can be used, including those at different voltages than the low voltage converter 208.

The power unit 112 can also provide power to equipment that uses alternating current rather than a direct current. In these examples, a front inverter 212A and a rear inverter 212B are provided. The front inverter 212A and the rear inverter 212B receive the power from the power unit 112 and converts the direct current/voltage provided by the power unit 112 to an alternating current/voltage used by various equipment. For example, as discussed in FIG. 1, each wheel assembly of the work machine are individually controllable. Illustrated in FIG. 2 are the wheel assembly 114B introduced in FIG. 1 and wheel assembly 214B. The wheel assemblies are comprised of an electrical motor that use AC power to cause the rotation of a shaft (not shown) of the electrical motor of the wheel assemblies 114B and 214B. The rear inverter 212B receives power (i.e., is in electrical communication with) from the power unit 112 through rear power cable 216. The front inverter 212A receives power from the power unit 112 through front power cable 217. The rear inverter 212B converts the electrical power from the power unit 112 and delivers the AC power to each of the wheel assemblies 114B and 214B, whereby the power delivered to each of the wheel assemblies 114B and 214B may be different as to each other and may be different as to wheel assemblies located in the front section 102, such as the wheel assembly 114A introduced in FIG. 1. In a similar manner, the front inverter 212A converts the electrical power from the power unit 112 and delivers the AC power to each of the wheel assemblies 114A and 214A, whereby the power delivered to each of the wheel assemblies 114A and 214A may be different as to each other and may be different as to wheel assemblies located in the rear section 104, such as the wheel assemblies 114B and 214B. In some examples described herein, the electrical power is a locally distributed power system whereby the front inverter 212A provides electrical power to equipment in the front section 102 and the rear inverter 212B provides electrical power to equipment in the rear section 104. Thus, the electrical power provided by the front inverter 212A and the rear inverter 212B is a locally distributed power system, meaning components receiving power from an inverter receives the power from an inverter located in the same section that the component is located. Thus, in some examples only a single power cable from the front section 102 to the rear section 104 from the power unit 112, i.e., the rear power cable 216, is used to provide power to the rear section 104 components rather than individual power cables to each of the components.

In addition to the low voltage battery 210, as described in FIG. 1, in some examples, the secondary battery 118 is used to power equipment requiring a higher voltage than what may be provided by the low voltage battery 210. In the example in which the power unit 112 is unavailable for use, the secondary battery 118 is used to provide power to the front and rear wheel assemblies, such as the wheel assemblies 114B and 214B, as well as the wheel assemblies 114A and a wheel assembly 214A. In the examples in which the secondary battery 118 is being used as the primary power source, power from the secondary battery 118 may be transmitted to the rear inverter 212B and/or the front inverter 212A to provide AC power to components powered by the rear inverter 212B and/or the front inverter 212A. In some examples, DC power provided by the secondary battery 118 is increased in voltage using a converter 220 (sometimes referred to as a "buck booster," "buck boost inductor," or "buck boost converter"). The converter 220 in some examples is a direct current to direct current converter that outputs a direct current voltage greater than the input voltage. In some examples, the higher voltage output of the converter 220 is received as a power input to the rear inverter 212B and/or the front inverter 212A to provide AC power to components powered by the rear inverter 212B and/or the front inverter 212A.

The work machine 100 further includes a locally distributed hydraulic system that provides hydraulic power hydraulic equipment used by the work machine 100. In FIG. 2, the work machine includes a front hydraulic pump 222A and a rear hydraulic pump 222B. The front hydraulic pump 222A is an electrical pump that receives a hydraulic fluid stored in a hydraulic tank 223 through hydraulic line 225A and pressurizes the hydraulic fluid for use by a front accumulator 224A. Similarly, the rear hydraulic pump 222B is an electrical pump that receives the hydraulic fluid stored in the hydraulic tank 223 through hydraulic line 225B and pressurizes the hydraulic fluid for use by a rear accumulator 224B. In a manner similar to the front inverter 212A and the rear inverter 212B, the front accumulator 224A is used to provide hydraulic pressure to hydraulic loads in the front section 102 and the rear accumulator 224B is used to provide hydraulic pressure to hydraulic loads in the rear section 104. In some examples, the hydraulic lines 225A and 225B are a relatively lower pressure hydraulic line. In this configuration, the hydraulic line from the front section 102 to the rear section 104, i.e., the hydraulic line 225B, is a lower pressure line.

In some examples, the work machine 100 has a first configuration in which the power unit 112 is removably affixed to the work machine 100. In the first configuration, the power unit 112 is charged by an external power source through a charging port 226 located on the work machine 100. Although in the first configuration the power unit 112 can be removed in certain instances such as during maintenance, the power unit 112 and the work machine 100 are configured to be primarily a combined, single unit during the use of the work machine 100. A cable (not shown) from the external power source is mechanically and electrically attached to the charging port 226. Electrical power is then transferred through the charging port 226 into the batteries 204 of the power unit 112 to recharge the batteries 204. When using the first configuration, because the power unit 112 remains electrically and mechanically connected to the work machine 100, some components described in FIG. 2 may not be needed. For example, the secondary battery 118, the power interface 206, and the converter 220 may not be required or desired in the first configuration. It should be understood, however, one or more of the aforementioned components, and other components not mentioned, may still be installed regardless of the configuration of the work machine 100. The work machine 100 may also have a second configuration in which the power unit 112 is removed and replaced with a second power unit. In the second configuration, when a new power unit 112 is to be used, the work machine 100 and the power unit 112 are configured to allow the power unit 112 to be removed from the work machine 100, after which a new; charged power unit 112 is installed onto the work machine, illustrated in more detail in FIGS. 3 and 4.

Figure 3:
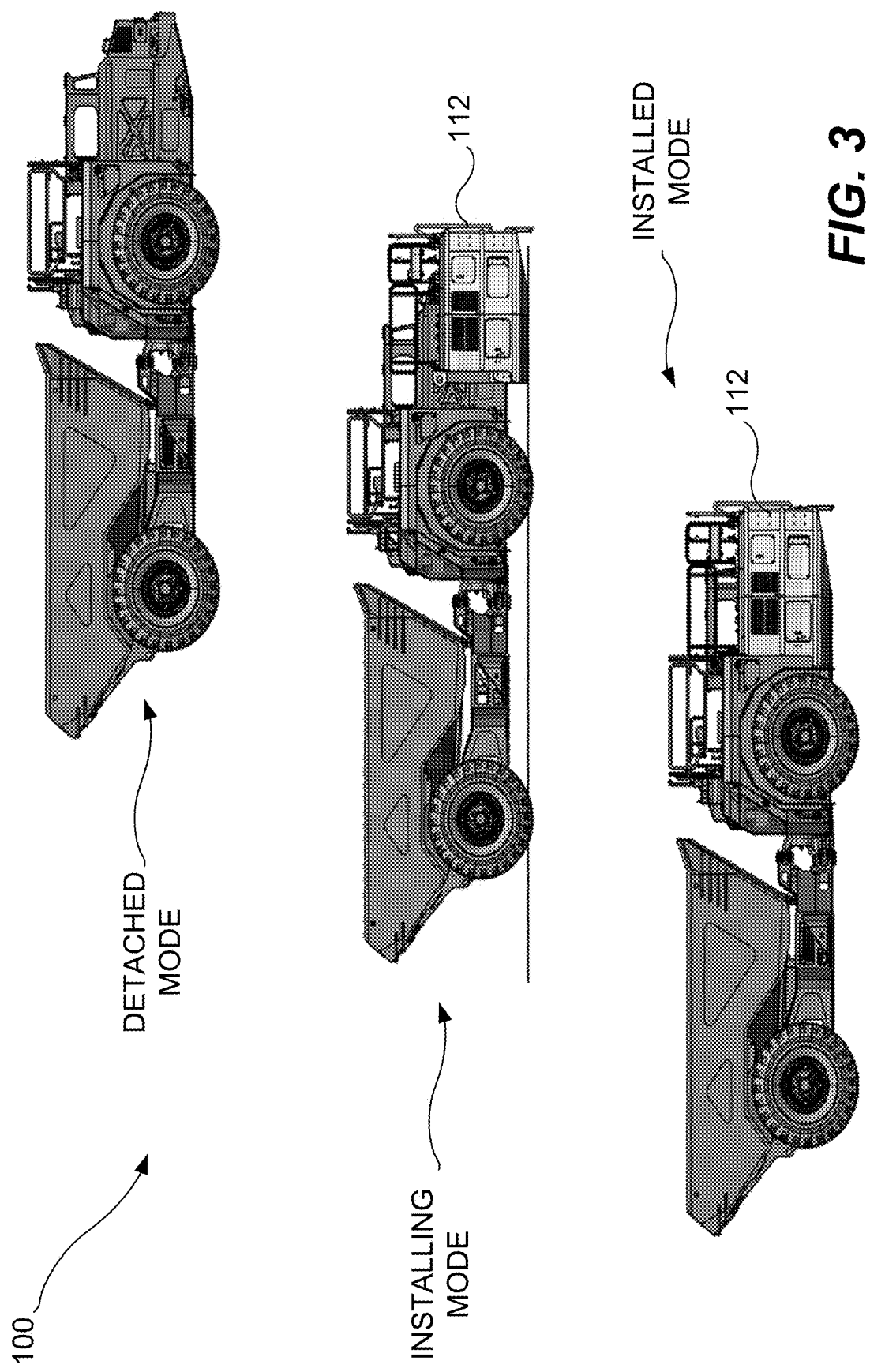
FIG. 3 illustrates the process of installing a power unit onto a work machine, in accordance with one or more examples of the present disclosure.

FIG. 3 illustrates the process of installing the power unit 112 onto the work machine in the second configuration of the work machine 100, in accordance with one or more examples of the present disclosure. Illustrated in FIG. 3 are a detached mode, an installing mode, and an installed mode of the work machine 100 in relation to the installation status of the power unit 112. In the detached mode, the work machine 100 is not engaged, or is disengaged, with a power unit. An example of the detached mode may include, but is not limited to, a period in which maintenance is being performed on the work machine 100 and no power unit 112 is needed. Another example of the detached mode may be when the work machine 100 has previously detached a power unit and is moving to another location to receive a new power unit. The installing mode represents the configuration in which the work machine 100 is moving or has moved to a location suitable to engage and receive the power unit 112. The installed mode represents the configuration in which the work machine 100 has received the power unit 112 and have mechanically and electrically connected the power unit 112 to the work machine 100 using a lift mechanism and the power interface 206, illustrated in additional detail in FIG. 4.

Figure 4:
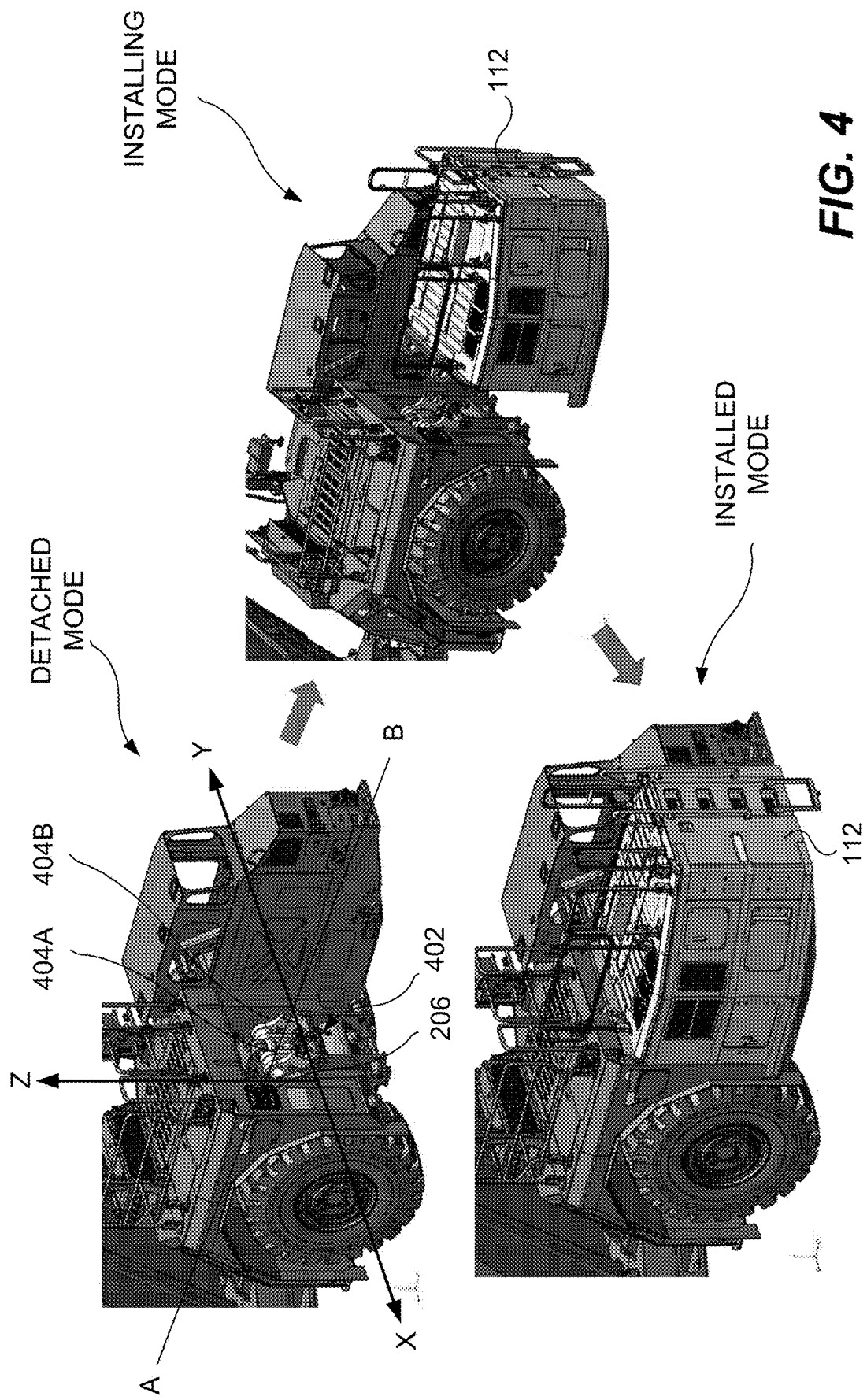
FIG. 4 is an illustration showing a lift mechanism used to mechanically engage a power unit with a work machine, in accordance with one or more examples of the present disclosure.

FIG. 4 is an illustration showing a lift mechanism 402 used to mechanically engage the power unit 112 with the work machine 100 and the power interface 206 used to electrically engage the power unit 112 with the work machine 100, in accordance with one or more examples of the present disclosure. FIG. 4 shows the detached mode, the installing mode, and the installed mode of the work machine 100. To mechanically engage the power unit 112 with the work machine 100, the lift mechanism 402 is provided. The lift mechanism 402 rotates about an axis XY, whereby the axis XY is normal to a centerline AB of the work machine 100. Lifter arms 404A and 404B engage with the power unit 112. When rotated about the axis XY, the lifter arms 404A and 404B move in the direction Z, lifting the power unit 112 off the ground and engaging the power unit 112 with the work machine 100. The lifter arms 404A and 404B are rotated using hydraulic power or electrical power. When the lifter arms 404A and 404B rotate to engage the power unit 112 with the work machine 100, electrical connections from the power unit are proved through the power interface 206 located on the work machine 100, described in additional detail in FIG. 5.

Figure 5:
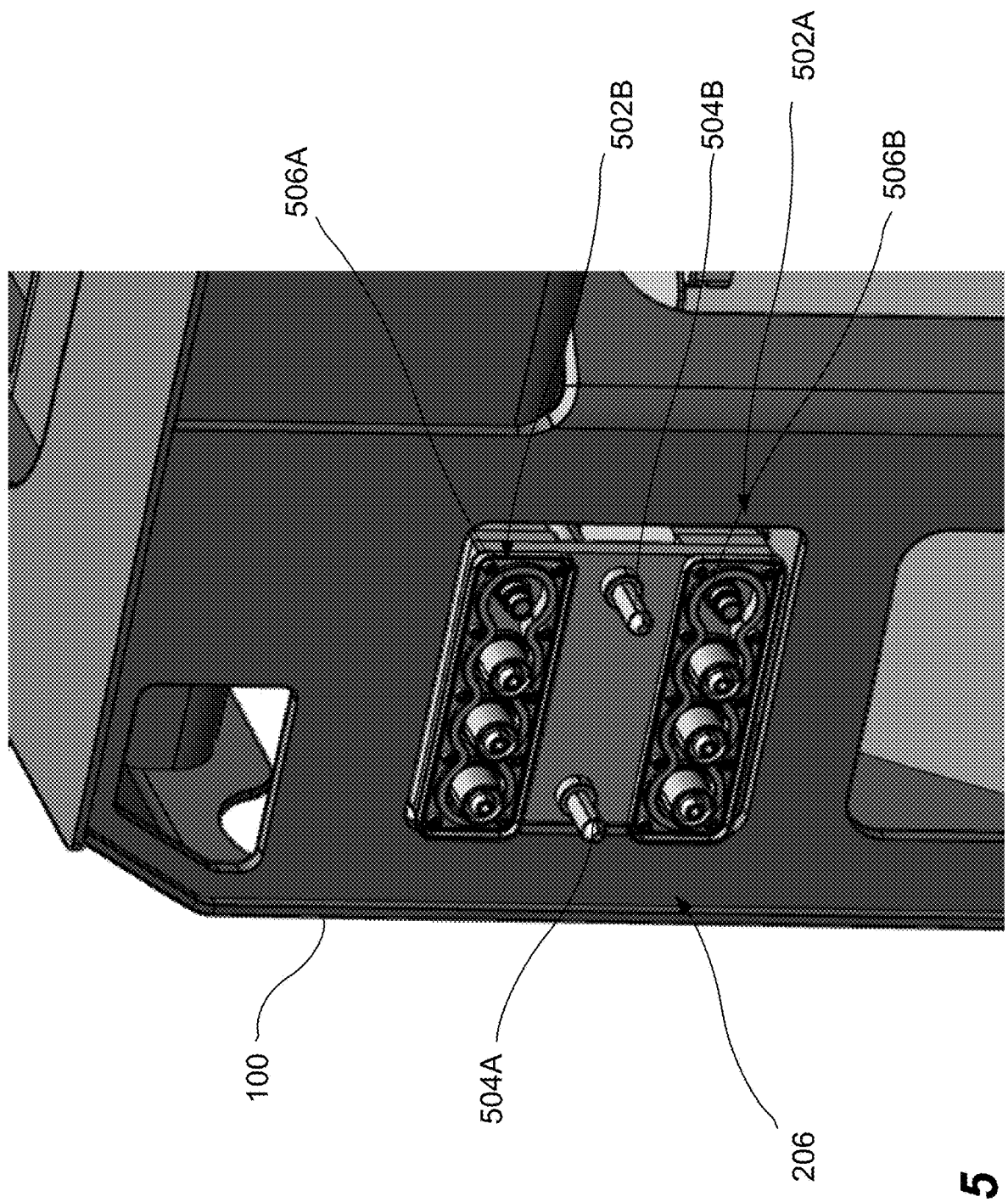
FIG. 5 is an illustration showing a power interface of a work machine, in accordance with one or more examples of the present disclosure.

FIG. 5 is an illustration showing the power interface 206 of the work machine 100, in accordance with one or more examples of the present disclosure. The power interface 206 includes male connectors 502A and 502B. The male connectors 502A and 502B extend a distance out from the work machine 100 to engage with complimentary female connectors, illustrated in FIG. 6. The power interface 206 further includes alignment pins 504A and 504B that also extend a distance out from the work machine 100 and engage with complementary female alignment holes shown in FIG. 6. The alignment pins 504A and 504B act as an indicator that the power unit 112, when lifted into the installed mode of FIGS. 3 and 4, is properly aligned and positioned onto the work machine 100. The male connectors 502A and 502B are electrically connected with various systems and are designed to receive various electrical inputs. For example, power connector 506A are configured to receive electrical power from the battery bank 202A and power connector 506B are configured to receive electrical power from the battery bank 202B. In some configurations, the battery bank 202A and the battery bank 202B are electrically connected so that the power from both the battery bank 202A and the battery bank 202B is provided through a single positive terminal and a single negative terminal. Thus, in this configuration, the power connector 506A are configured to receive electrical power from the positive terminal of the battery banks 202A and 202B and the power connector 506B are configured to connect to the negative or ground terminal of the battery banks 202A and 202B. The male connectors 502A and 502B may provide an electrical connection for other electrical signals such as data, communication systems, additional power systems, sensors, and the like.

Figure 6:
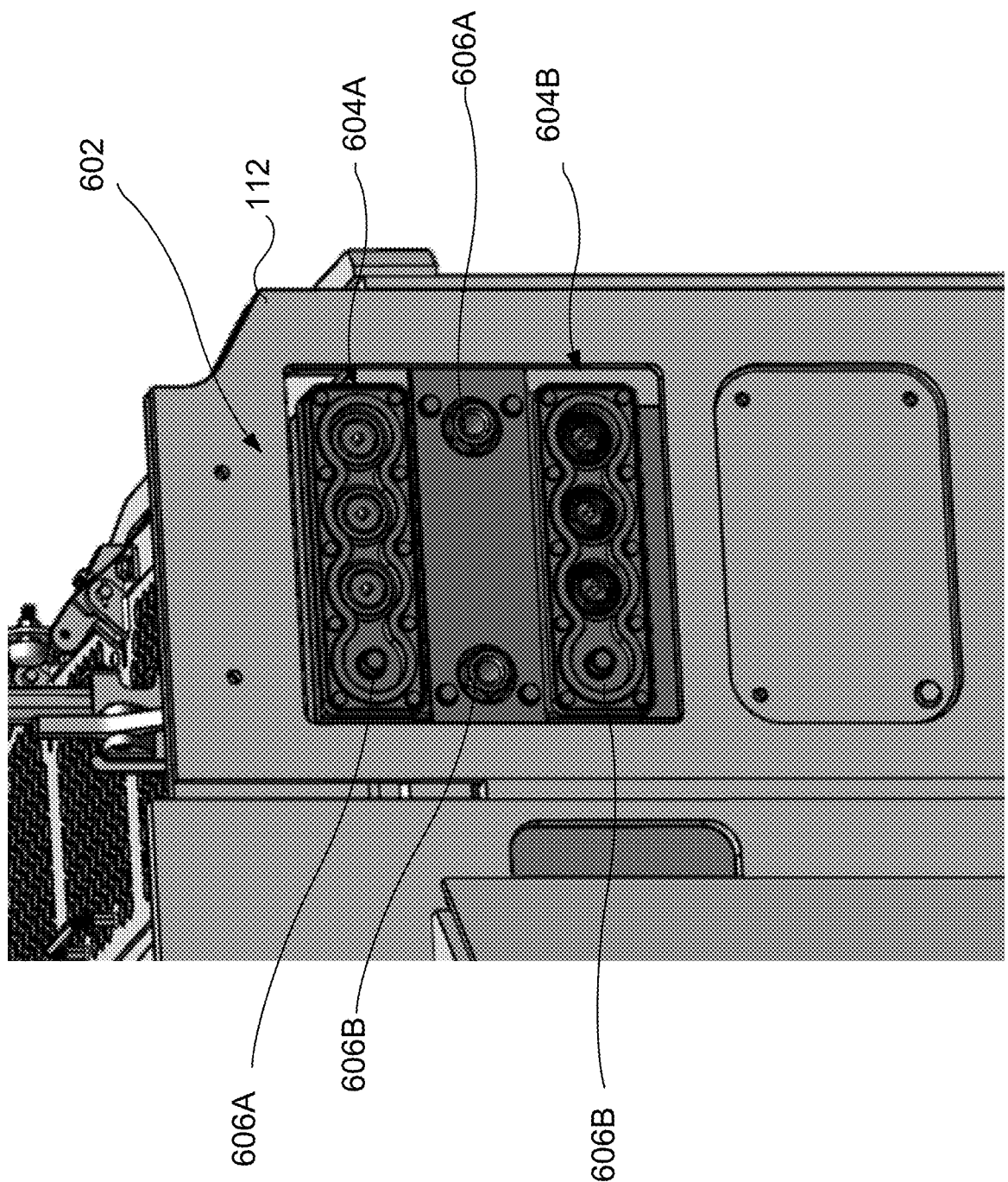
FIG. 6 is an illustration showing a power unit interface of a power unit used to electrically connect the power unit with a work machine, in accordance with one or more examples of the present disclosure.

FIG. 6 is an illustration showing a power unit interface 602 of the power unit 112 used to electrically connect the power unit 112 with the work machine 100, in accordance with one or more examples of the present disclosure. The power unit interface 602 includes female recesses 604A and 604B. The female recesses 604A and 604B extend a distance into the work machine 100 to receive the complementary male connectors 502A and 502B of the power interface 206 that are inserted into complementary female recesses 604A and 604B. The power unit interface 602 further includes alignment recesses 606A and 606B that receive the alignment pins 504A and 504B. The female power connector 608A receives the power connector 506A and the female power connector 608B receives the power connector 508B to be distributed to various systems, including locally distributed systems such as the wheel assemblies 114A, 114B, 214A, and 214B.

Figure 7:
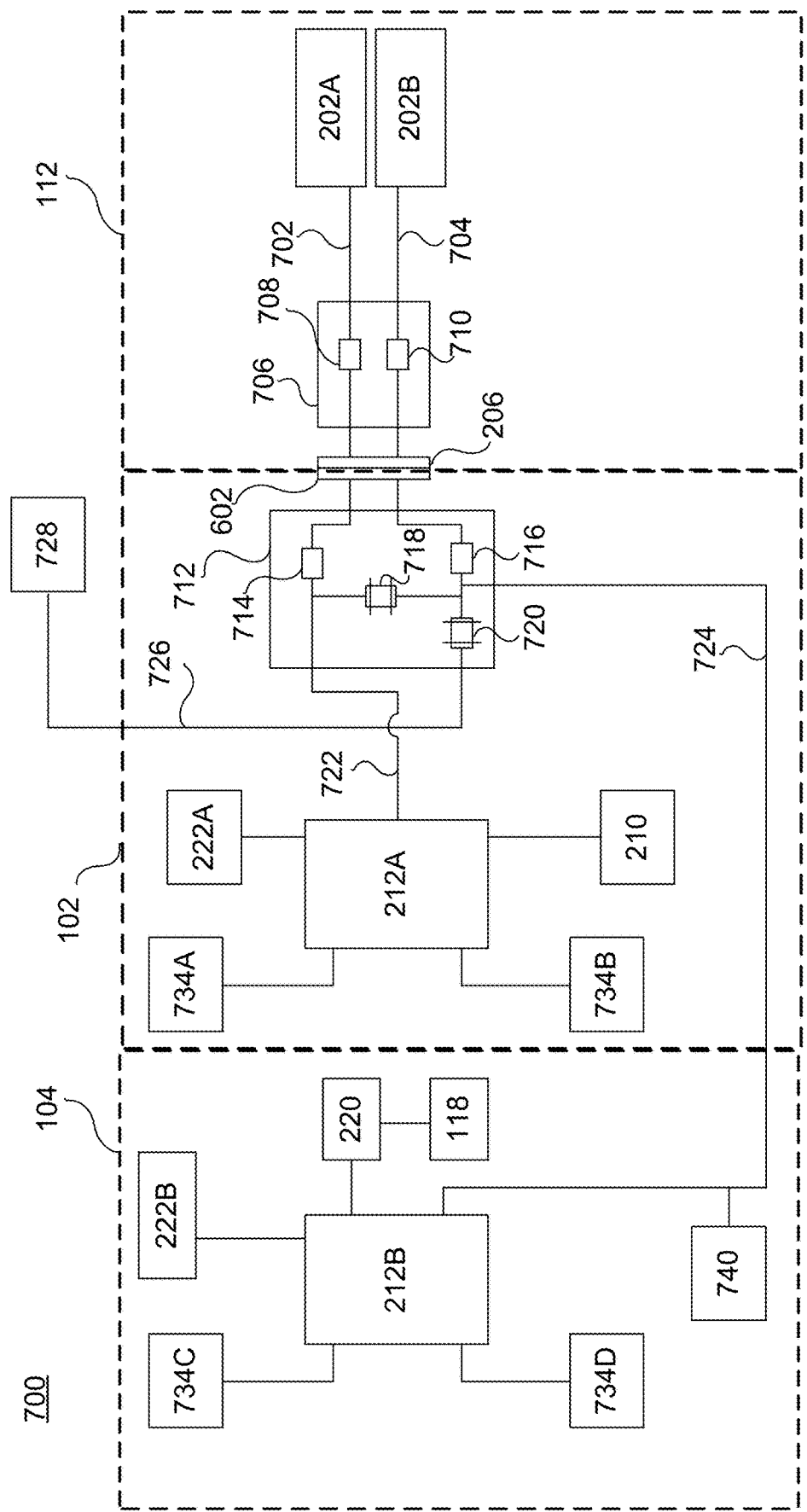
FIG. 7 is an illustration showing a direct current (DC) power system in an operational mode, in accordance with one or more examples of the present disclosure.

Because, in some examples, the work machine 100 uses a locally distributed power system, meaning the work machine 100 has more than one power component being powered by direct current power, oscillations of direct current can occur due to the interactions of these power components. Oscillations of direct current, creating alternating currents within the direct current power system, can occur when the power components are comprised of reactive components such as inductors and capacitors. Reactive power components of the work machine can include the front inverter 212A and the rear inverter 212B. As described above, a portion of the direct current power system of the work machine 100 services various loads. For example, a portion of the direct current power received from the power unit 112 at the rear inverter 212B is received through the rear power cable 216. Similarly, a portion of the direct current power received from the power unit 112 at the front inverter 212A is received through the front power cable 217. It should be understood, however, that the presently disclosed subject matter is not limited to inverters, as other reactive components used on the work machine 100 may cause oscillations of direct current. The locally distributed power system of the work machine 100 is configured to provide for multiple reactive loads serviced by the power unit 112, described in more detail in FIGS. 7-9, below:

FIG. 7 is an illustration showing a direct current (DC) power system 700 in an operational mode, in accordance with one or more examples of the presently disclosed subject matter. Illustrated in FIG. 7 are the power unit 112, the front section 102, and the rear section 104 of the work machine 100. It should be noted that, although the DC power system 700 of the work machine 100 is illustrated as being distributed through multiple sections of the work machine 100, i.e., the front section 102 and the rear section 104, the presently disclosed subject matter is not limited to implementations on work machines 100 with multiple sections. Returning to FIG. 7, the power unit 112 provides direct current power on DC bus 702 to the work machine 100 from the battery bank 202A and direct current power on DC bus 704 to the work machine 100 from the battery bank 202B. The DC bus 702 and the DC bus 704 feed into a power unit power distribution unit (PDU) 706. The power unit PDU 706 is configured to receive control inputs from a controller (described in FIG. 11) that opens and closes a bus connector 708 and a bus connector 710. When in an open configuration, the bus connector 708 electrically disconnects the battery bank 202A from the DC power system 700, and when in a closed configuration, the bus connector 708 electrically connects the battery bank 202A to the DC power system 700. Similarly, when in an open configuration, the bus connector 710 electrically disconnects the battery bank 202B from the DC power system 700, and when in a closed configuration, the bus connector 710 electrically connects the battery bank 202B to the DC power system 700.

Power from the DC bus 702 and the DC bus 704 is received into a machine power distribution unit (PDU) 712 through the power unit interface 602 and the power interface 206. The machine PDU 712 is a configured to receive control inputs from a controller (described by way of example in FIG. 11 as controller 1100) to place in an open or closed configuration the bus connectors 714, 716, 718, and 720, which are switches that the machine PDU 712 are opens and closes to configure the DC power system 700 for various uses, discussed in more detail below: Electrical power from the machine PDU 712 is distributed to a DC bus 722 and a DC bus 724. The DC bus 722 provides power to the front inverter 212A and the rear inverter 212B. The front inverter 212A and the rear inverter 212B converts the DC power received through the machine PDU 712 and converts the DC power to alternating current (AC) power for various loads that use AC power. For example, the front inverter 212A provides AC power to a front traction motor 734A and a front traction motor 734B. The front traction motor 734A is the electrical motor of the wheel assembly 114A and the front traction motor 734B is the electrical motor of the wheel assembly 214B. The front inverter 212A also provides AC power to the front hydraulic pump 222A, which as described above, is an electrical pump that receives a hydraulic fluid stored in the hydraulic tank 223 through the hydraulic line 225A and pressurizes the hydraulic fluid for use by the front accumulator 224A. The DC bus 722 also provides power to charge the low voltage battery 210.

The rear inverter 212B provides AC power to a rear traction motor 734C and a rear traction motor 734D. The rear traction motor 734C is the electrical motor of the wheel assembly 114A and the rear traction motor 734D is the electrical motor of the wheel assembly 214A. The rear inverter 212B also provides AC power to the rear hydraulic pump 222B, which as described above, is an electrical pump that receives a hydraulic fluid stored in the hydraulic tank 223 through the hydraulic line 225B and pressurizes the hydraulic fluid for use by the rear accumulator 224B. A low voltage battery 740 may be charged from DC power over the dc bus 724. The rear inverter 212B is also in electrical communication with the converter 220. The converter 220 receives power from the secondary battery 118 and outputs a direct current voltage greater than the input voltage from the secondary battery 118. As described above, if the power unit 112 is unavailable for use, the power from the converter 220 can be used to provide power the rear inverter 212B, providing for AC power when the power unit 112 is unavailable for use. It should be understood that the electrical loads described and illustrated in FIG. 7 are by way of example and is not an intent to limit the scope of the presently disclosed subject matter. For example, the DC power system 700 may include more than two inverters, different types of reactive loads, and the like.

The configuration of the DC power system 700, established by the machine PDU 712, is an operational mode. In the operational mode, the bus connectors 714 and 716 are closed (meaning current is allowed to flow through the bus connectors) and the bus connectors 718 and 720 are closed (meaning current is not allowed to flow through the bus connectors). The bus connector 720 being open in the operational mode electrically disconnects the DC power system 700 from an external power source 728 that may be used to charge the battery bank 202A and/or the battery bank 202B. As illustrated, the battery bank 202A is in electrical communication with and provides power through the DC bus 722. Additionally, the battery bank 202B is in electrical communication with and provides power through the DC bus 724. In the operational mode, as illustrated, the DC power system 700 is split, whereby the loads on the battery bank 202A are not in electrical communication with the loads on the battery bank 202B. Thus, the reactive loading of the front inverter 212A does not affect or interact with the reactive loading of the rear inverter 212B. Thus, in the operational mode, the front inverter 212A is prevented from creating a resonance circuit with rear inverter 212B. The operational mode is typically used when the work machine 100 is being operated and the power unit 112 is available for use. However, in some examples, the battery bank 202A and/or the battery bank 202B may need to be charged. In this example, the DC power system 700 may be configured into a charging mode.

Figure 8:
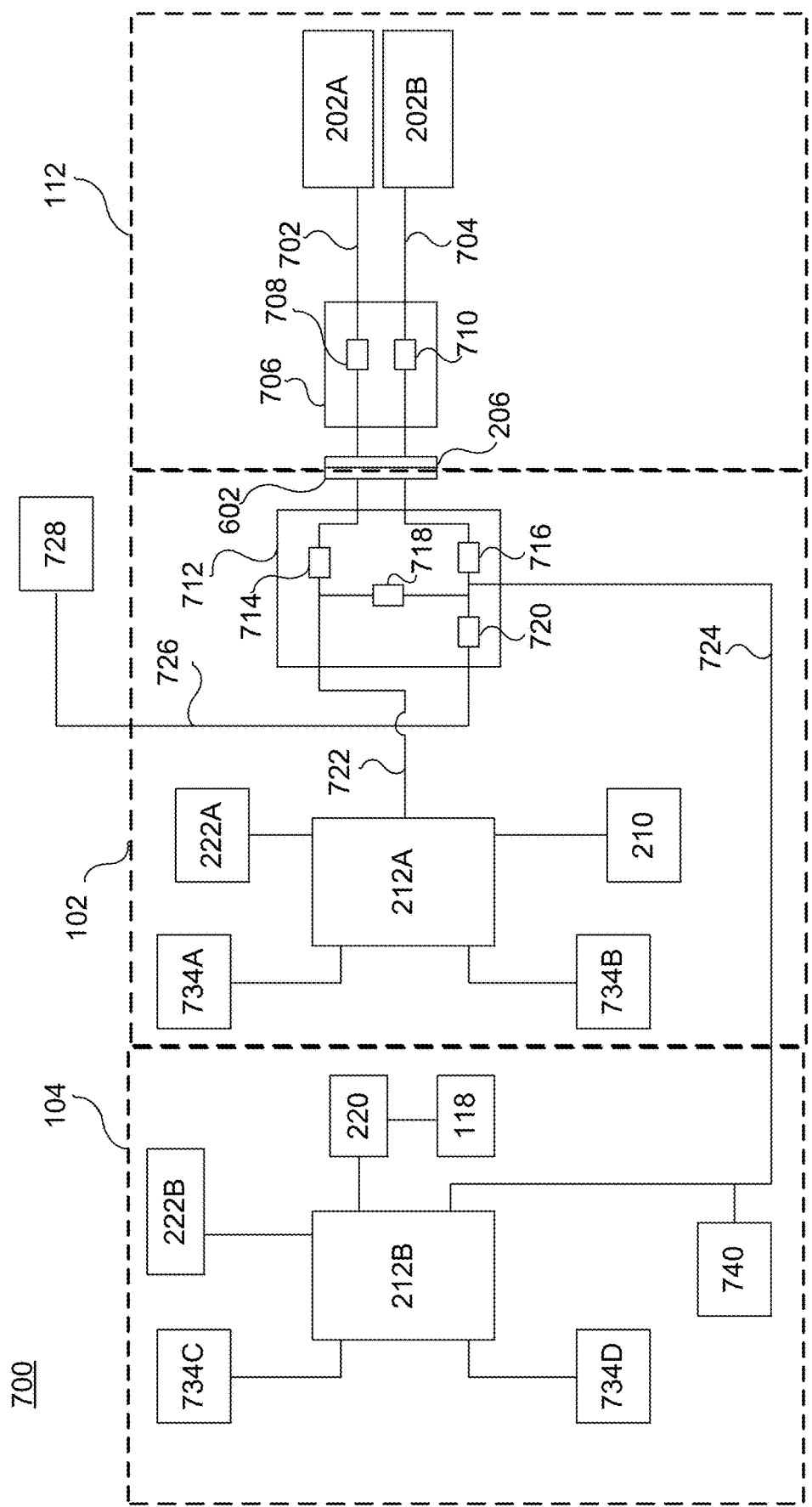
FIG. 8 is an illustration showing a DC power system in a charging mode, in accordance with one or more examples of the present disclosure.

FIG. 8 is an illustration showing the DC power system 700 in a charging mode, in accordance with one or more examples of the presently disclosed subject matter. In the charging mode, the bus connectors 714, 716, 718, and 720 are closed (meaning current is allowed to flow through the bus connectors). As illustrated, the battery bank 202A and the battery bank 202B are in electrical communication with, and receives power from, the external power source 728 through charge bus 726. Power from the external power source 728 enters the machine PDU 712 through the bus connector 720. The power from the external power source 728 is then directed to the power unit PDU 706 through the power unit interface 602 and the power interface 206. The power received by the battery bank 202A through the DC bus 702 charges the battery bank 202A. The power received by the battery bank 202A through the DC bus 702 charges the battery bank 202A. It should be understood that the presently disclosed subject matter is not limited to simultaneous charging of both the battery bank 202A and the battery bank 202B, as each battery bank can be charged separately. For example, the bus connector 718 and/or the bus connector 714 can be opened, thereby electrically disconnecting the battery bank 202A from the external power source 728. In some instances, power from the external power source 728 may not be available to charge the battery bank 202A and/or the battery bank 202B. For example, the work machine 100 may be in a location along a haul route where the external power source 728 is not available. In this example, the DC power system 700 may be configured into a reduced power mode, illustrated in FIG. 9.

Figure 9:
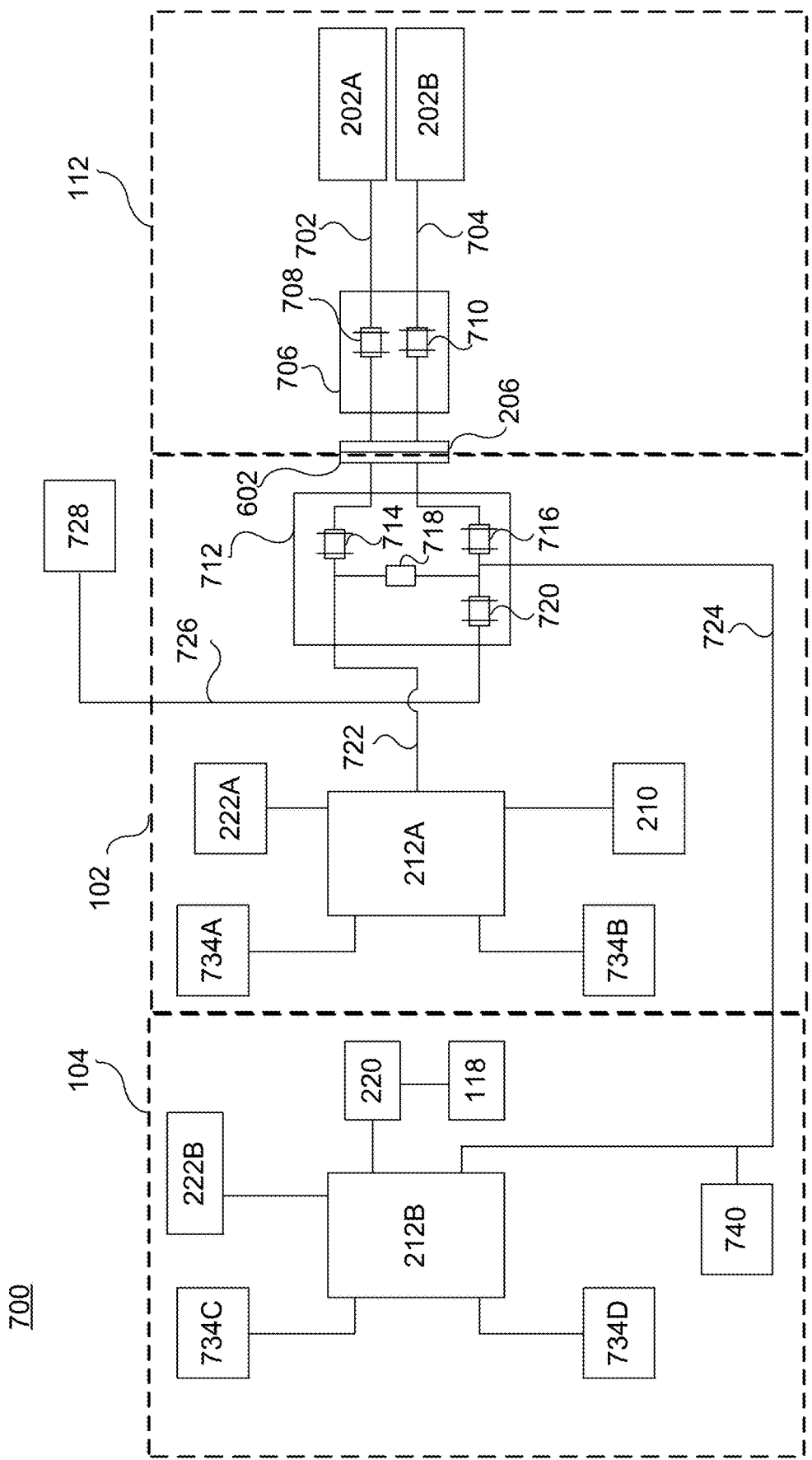
FIG. 9 is an illustration showing a DC power system in a reduced power mode, in accordance with one or more examples of the present disclosure.

FIG. 9 is an illustration showing the DC power system 700 in a reduced power mode, in accordance with one or more examples of the presently disclosed subject matter. In the reduced power mode, DC power from the secondary battery 118 is used to power the rear inverter 212B. Thus, in this configuration, the rear inverter 212B still generates AC power for certain loads, such as the rear traction motors 734C and 734C, thus allowing at least partial mobility of the work machine 100. In further configurations, the DC power from the secondary battery 118 is used to power the front inverter 212A, either in combination with powering the rear inverter 212B or in lieu of powering the rear inverter 212B. In the configuration in which the front inverter 212A receives power from the secondary battery 118, the front inverter 212A can power the front traction motors 734A and/or 734B. In some configurations, the power provided to the front inverter 212A may be AC power from the rear inverter 212B or may be DC power routed from the rear inverter 212B into the front inverter 212A. If AC power from the rear inverter 212B is provided, the front inverter 212A is not used, and the AC power from the rear inverter 212B is directed through the front inverter 212A into the loads normally serviced by the front inverter 212A. If AC power from the rear inverter 212B is not provided, meaning DC power from the secondary battery 118 is provided to the front inverter 212A, the front inverter 212A receives the DC power and converts the DC power into AC power to service one or more loads normally serviced by the front inverter 212A.

In some examples in which the DC power from the secondary battery 118 is provided to the front inverter 212A, the rear inverter 212B may not be in use. Therefore, the reduced power mode can have at least three configurations. In a first configuration, both the rear inverter 212B and the front inverter 212A are receiving DC power from the battery and are being used to generate AC power for their respective loads. In a second configuration, the rear inverter 212B is generating AC power and the front inverter 212A is not generating DC power. In this second configuration, the rear inverter 212B can be used to power loads normally serviced by the front inverter 212A. In a third configuration, the rear inverter 212B is not generating AC power and the front inverter 212A is generating DC power from DC power provided by the secondary battery 118. In this third configuration, the front inverter 212A can be used to power loads normally serviced by the rear inverter 212B. In the reduced power mode, the bus connectors 714, 716, and 720 are open and the bus connector 718 is closed. In the reduced power mode, the rear inverter 212B and/or the front inverter 212A can be used to provide power to various loads of the DC power system 700 when the power unit 112 is unavailable for use. However, in some examples, rather than a complete unavailability of use, one of the battery banks of the power unit 112 can still be available for use. In this example, the DC power system 700 may be configured into a battery bank isolation mode, illustrated in FIG. 10.

Figure 10:
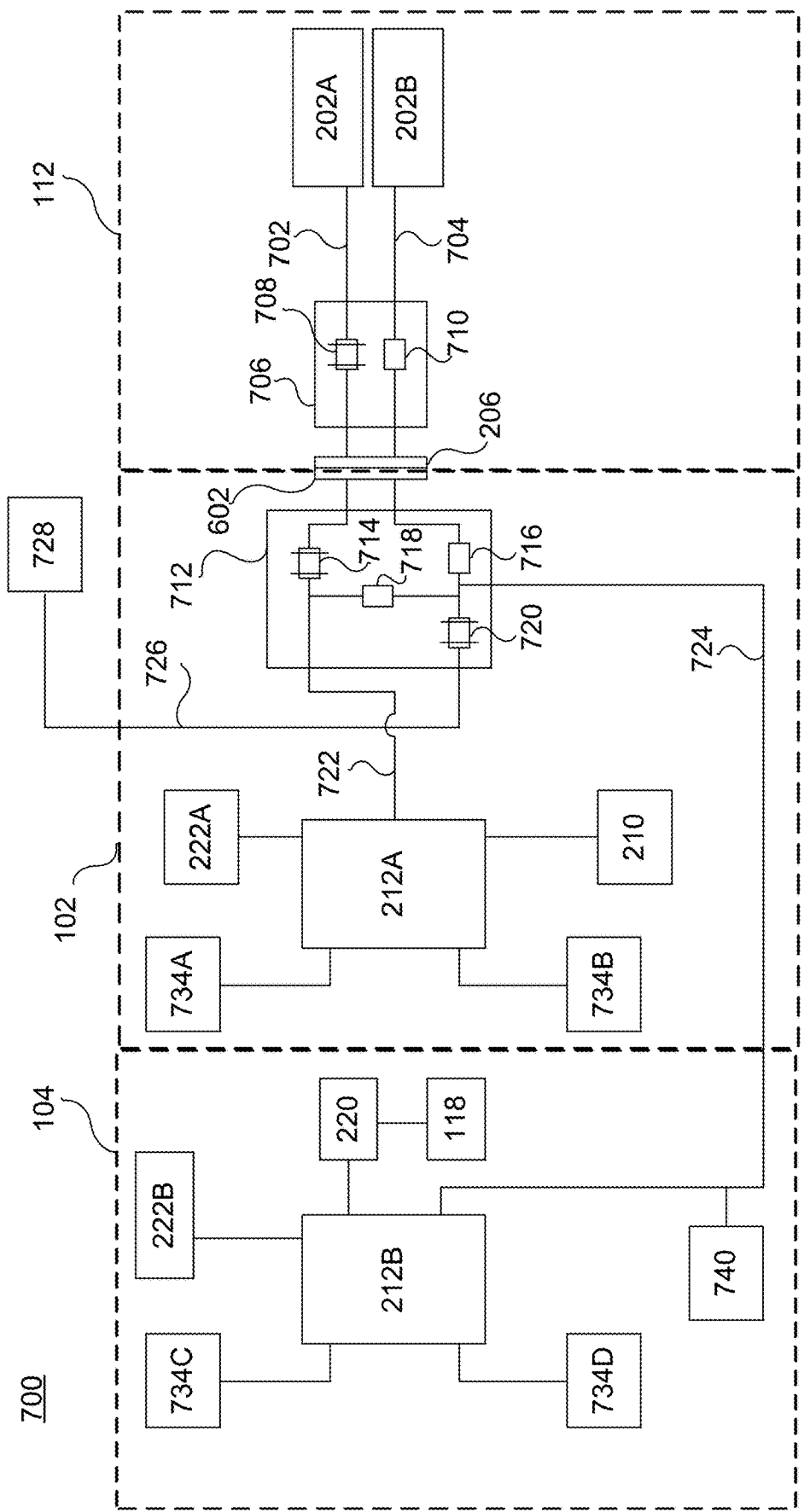
FIG. 10 is an illustration showing a DC power system in a battery bank isolation mode, in accordance with one or more examples of the present disclosure.

FIG. 10 is an illustration showing DC power system 700 in a battery bank isolation mode, in accordance with one or more examples of the presently disclosed subject matter. In the battery bank isolation mode, one of the battery banks of the power unit 112 is unavailable for use and is electrically disconnected from the DC power system 700. An example situation in which the battery bank isolation mode is used can be when a fault on the DC bus 702, such as short, requires the battery bank 202A to be electrically disconnected from the DC power system 700. In this example, the bus connectors 714 and 720 are open and the bus connectors 716 and 718 are closed. Additionally, the bus connector 708 is closed. In this configuration, the battery bank 202A is electrically isolated from the DC power system, whereby the battery bank 202B provides DC power to the DC power system 700. DC power from the battery bank 202B is in electrical communication with the rear inverter 212B through the bus connector 716 and the front inverter 212A through the bus connector 718. It should be understood that battery bank isolation mode can also include a configuration in which only the rear inverter 212B receives power by opening bus connector 718.

Figure 11:
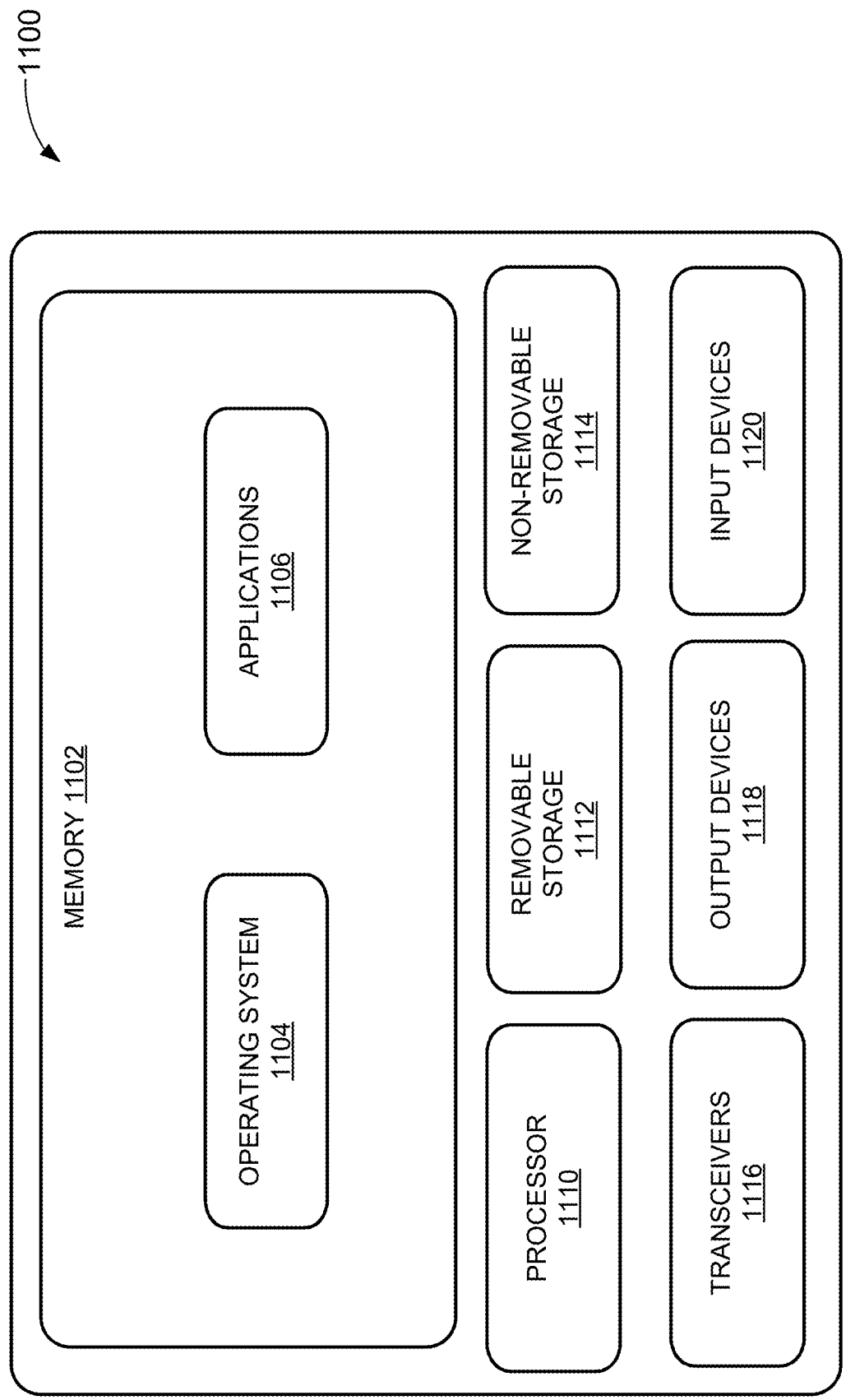
FIG. 11 depicts a component level view of a machine PDU for use with the systems and methods described herein, in accordance with various examples of the presently disclosed subject matter.

FIG. 11 depicts a component level view of a controller 1100 for providing control inputs to the machine PDU 712 and/or the power unit PDU 706 for use with the systems and methods described herein, in accordance with various examples of the presently disclosed subject matter. The controller 1100 could be any device capable of providing the functionality associated with the systems and methods described herein. The controller 1100 can comprise several components to execute the above-mentioned functions. The controller 1100 may be comprised of hardware, software, or various combinations thereof. As discussed below, the controller 1100 can comprise memory 1102 including an operating system (OS) 1104 and one or more standard applications 106.

The controller 1100 can also comprise one or more processors 1110 and one or more of removable storage 1112, non-removable storage 1114, transceiver(s) 1116, output device(s) 1118, and input device(s) 1120. In various implementations, the memory 1102 can be volatile (such as random access memory (RAM)), non-volatile (such as read only memory (ROM), flash memory, etc.), or some combination of the two. The memory 1102 be stored on a remote server or a cloud of servers accessible by the controller 1100.

The memory 1102 can also include the OS 1104. The OS 1104 varies depending on the manufacturer of the controller 1100. The OS 1104 contains the modules and software that support basic functions of the controller 1100, such as scheduling tasks, executing applications, and controlling peripherals. The OS 1104 can also enable the controller 1100 to send and retrieve other data and perform other functions, such as transmitting control signals to open and close the bus connectors 714, 716, 718, and 720 using the transceivers 1116 and/or output devices 1118 and receiving signals using the input devices 1120.

The controller 1100 can also comprise one or more processors 1110. In some implementations, the processor(s) 1110 can be one or more central processing units (CPUs), graphics processing units (GPUs), both CPU and GPU, or any other combinations and numbers of processing units. The controller 1100 may also include additional data storage devices (removable and/or non-removable) such as, for example, magnetic disks, optical disks, or tape. Such additional storage is illustrated in FIG. 11 by removable storage 1112 and non-removable storage 1114.

Non-transitory computer-readable media may include volatile and nonvolatile, removable and non-removable tangible, physical media implemented in technology for storage of information, such as computer readable instructions, data structures, program modules, or other data. The memory 1102, removable storage 1112, and non-removable storage 1114 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 1100. Any such non-transitory computer-readable media may be part of the controller 1100 or may be a separate database, databank, remote server, or cloud-based server.

In some implementations, the transceiver(s) 1116 include any transceivers known in the art. In some examples, the transceiver(s) 1116 can include wireless modem(s) to facilitate wireless connectivity with other components (e.g., between the controller 1100 and a wireless modem that is a gateway to the Internet), the Internet, and/or an intranet. Specifically, the transceiver(s) 1116 can include one or more transceivers that can enable the controller 1100 to send and receive data. Thus, the transceiver(s) 1116 can include multiple single-channel transceivers or a multi-frequency, multi-channel transceiver to enable the controller 1100 to send and receive video calls, audio calls, messaging, etc. The transceiver(s) 1116 can enable the controller 1100 to connect to multiple networks including, but not limited to 2G, 3G, 4G, 5G, and Wi-Fi networks, or other controllers. The transceiver(s) 1116 can also include one or more transceivers to enable the controller 1100 to connect to future (e.g., 6G) networks, Internet-of-Things (IoT), machine-to machine (M2M), and other current and future networks.

The transceiver(s) 1116 may also include one or more radio transceivers that perform the function of transmitting and receiving radio frequency communications via an antenna (e.g., Wi-Fi or Bluetooth®). In other examples, the transceiver(s) 1116 may include wired communication components, such as a wired modem or Ethernet port, for communicating via one or more wired networks. The transceiver(s) 1116 can enable controller 1100 to facilitate audio and video calls, download files, access web applications, and provide other communications associated with the systems and methods, described above.

In some implementations, the output device(s) 1118 include any output devices known in the art, such as a display (e.g., a liquid crystal or thin-film transistor (TFT) display), a touchscreen, speakers, a vibrating mechanism, or a tactile feedback mechanism. Thus, the output device(s) 1118 can include a screen or display. The output device(s) 1118 can also include speakers, or similar devices, to play sounds or ringtones when an audio call or video call is received. Output device(s) 1118 can also include ports for one or more peripheral devices, such as headphones, peripheral speakers, or a peripheral display.

In various implementations, input device(s) 1120 include any input devices known in the art. For example, the input device(s) 1120 may include a camera, a microphone, or a key board/keypad. The input device(s) 1120 can include a touch-sensitive display or a key board to enable users to enter data and make requests and receive responses via web applications (e.g., in a web browser), make audio and video calls, and use the standard applications 406, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 1120 and an output device 1118.

INDUSTRIAL APPLICABILITY

The work machine 100 described herein uses DC power system 700 that reduces the probability of reactive loads on the power unit 112 creating an oscillating circuit by isolating one or more reactive loads from other reactive loads. If not isolated onto different DC buses, the reactive loads, such as the front inverter 212A and the rear inverter 212B, can interact with each other and form systems that are capable of oscillation. Oscillation is a condition in which an alternating current/voltage is created by the interaction of these reactive loads. The alternating current/voltage can damage electrical equipment configured to only receive DC power. In some scenarios, the damage can be extensive enough to pose a safety hazard to personnel and equipment. Although there may be electrical devices that can dampen the magnitude of the oscillation, these devices often act as parasitic loads, reducing the run time of the battery by draining the battery faster than if the devices were not used. In an electrically powered work machine 100, the parasitic loads of the dampeners may result in a reduction in the time the work machine 100 can be used.

Rather than using parasitic loads to dampen oscillations, the DC power system 700 uses the split battery banks 202A and 202B of the power unit 112 to provide the isolation. Thus, oscillating currents are not created by the interaction of the front inverter 212A with the rear inverter 212B because the inverters are on separate DC power buses. However, in some situations, it may not be feasible or preferable to place the inverters 212A and 212B on separate DC. In other situations, it may not be possible to use the power unit 112. Thus, in these situations, the DC power system 700 uses the machine PDU 712 to electrically connect the front inverter 212A with the rear inverter 212B using bus connectors. Thus, the DC power system 700 can reduce oscillations by isolating reactive loads like the rear inverter 212B and front inverter 212A from each other while providing the flexibility of connecting the components in situations requiring the electrical connection.

Unless explicitly excluded, the use of the singular to describe a component, structure, or operation does not exclude the use of plural such components, structures, or operations or their equivalents. As used herein, the word "or" refers to any possible permutation of a set of items. For example, the phrase "A, B, or C" refers to at least one of A, B, C, or any combination thereof, such as any of: A: B: C: A and B: A and C: B and C: A, B, and C: or multiple of any item such as A and A: B, B, and C: A, A, B, C, and C: etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A work machine direct current power system, comprising: a power unit comprising:
   a first battery bank configured to output direct current power on a first direct current bus;
   a second battery bank configured to direct current power on a second direct current bus; and
a machine power distribution unit, comprising:
   a first bus connector that when in an open configuration electrically disconnects the first direct current bus from a third direct current bus and when in a closed configuration electrically connects the first direct current bus to the third direct current bus, wherein the third direct current bus services a first reactive load of the work machine when the first bus connector is in the closed configuration; and
   a second bus connector that when in an open configuration electrically disconnects the second direct current bus from a fourth direct current bus and when in a closed configuration electrically connects the second direct current bus to the fourth direct current bus, wherein the fourth direct current bus services a second reactive load of the work machine when the second bus connector is in the closed configuration;
   wherein the second reactive load further comprises a secondary battery, wherein the secondary battery is configured to provide direct current power to other components of the second reactive load through a converter;
   wherein the machine power distribution unit further comprises a third bus connector that when in an open configuration electrically disconnects the third direct current bus from the fourth direct current bus and when in a closed configuration electrically connects the third direct current bus to the fourth direct current bus,
   wherein when direct current power is not provided by the power unit and the first bus connector and the second bus connector are both open:
      the third bus connecter is closed to electrically connect the third direct current bus to the fourth direct current bus, wherein the secondary battery provides direct current power to the converter, and wherein the converter provides direct current power to the first reactive load and the second reactive load.

2. The work machine direct current power system of claim 1, wherein the machine power distribution unit and the first reactive load are installed on a front section of the work machine and the second reactive load is installed on a rear section of the work machine.

3. The work machine direct current power system of claim 2, wherein the first reactive load comprises a first inverter configured to provide alternating current power to a first plurality of equipment installed on the front section of the work machine and the second reactive load comprises a second inverter configured to provide alternating current power to a second plurality of equipment installed on the rear section of the work machine.

4. The work machine direct current power system of claim 3, wherein the first plurality of equipment installed on the front section of the work machine comprises a first traction motor and a second traction motor.

5. The work machine direct current power system of claim 4, wherein the first plurality of equipment installed on the front section of the work machine further comprises a front hydraulic pump configured to pressurize a hydraulic fluid in a front accumulator.

6. The work machine direct current power system of claim 3, wherein the second plurality of equipment installed on the rear section of the work machine comprises a third traction motor and a fourth traction motor.

7. The work machine direct current power system of claim 6, wherein the second plurality of equipment installed on the rear section of the work machine further comprises a rear hydraulic pump configured to pressurize a hydraulic fluid in a rear accumulator.

8. The work machine direct current power system of claim 1, wherein the machine power distribution unit further comprises a fourth bus connector that when in an open configuration electrically disconnects an external power source from the power unit and when in a closed configuration electrically connects the external power source to the power unit to charge the power unit.

9. The work machine direct current power system of claim 1, further comprising a power unit power distribution unit installed on the power unit and configured to receive the direct current power on the first direct current bus and the second direct current bus, the power unit power distribution unit comprising:
   a fifth bus connector that when in an open configuration electrically disconnects the first battery bank from the first direct current bus and when in a closed configuration electrically connects the first battery bank to the first direct current bus; and
   a sixth bus connector that when in an open configuration electrically disconnects the second battery bank from the second direct current bus and when in a closed configuration electrically connects the second battery bank to the second direct current bus.

10. A controller of a work machine direct current power system, comprising:
   a first memory storing computer-executable instructions; and
   a first processor in communication with the memory, the computer-executable instructions causing the first processor to perform acts comprising:
      placing the direct current power system in an operational mode by:
         opening a first bus connector to electrically disconnect a first direct current bus from a second direct current bus, thereby electrically disconnecting a first reactive load of the work machine from a second reactive load of the work machine;
         closing a second bus connector to electrically connect a first battery bank of a power unit to the first direct current bus to provide power to the first reactive load of the work machine; and
         closing a third bus connector to electrically connect a second battery bank of the power unit to the second direct current bus to provide direct current power to the second reactive load of the work machine;
      placing the direct current power system in a reduced power mode by:
         closing the first bus connector to electrically connect the first direct current bus to the second direct current bus, wherein the secondary battery provides direct current power to a converter, and wherein the converter provides direct current power to the second direct current bus;

opening the second bus connector to electrically disconnect the first battery bank from the first direct current bus; and opening the third bus connector to electrically disconnect the second battery bank from the second direct current bus, wherein in the reduced power mode the secondary battery provides direct current power to the first reactive load and the second reactive load.

11. The controller of the work machine direct current power system of claim 10, further comprising instructions to cause the first process to perform acts to place the direct current power system in a charging mode, the acts comprising:

closing the first bus connector to electrically connect the first direct current bus to the second direct current bus:

closing the second bus connector to electrically connect the first direct current bus to the first battery bank;

closing the third bus connector to electrically connect the second direct current bus to the second battery bank; and closing a fourth bus connector to electrically connect an external power source to the second direct current bus, wherein the external power source is configured to charge the first battery bank through the first direct current bus and the second battery bank through the second direct current bus.

12. The controller of the work machine direct current power system of claim 10, wherein a machine power distribution unit and the first reactive load are installed on a front section of the work machine and the power distribution unit second reactive load is installed on a rear section of the work machine.

13. The controller of the work machine direct current power system of claim 12, wherein the first reactive load comprises a first inverter configured to provide alternating current power to a first plurality of equipment installed on the front section of the work machine and the second reactive load comprises a second inverter configured to provide alternating current power to a second plurality of equipment installed on the rear section of the work machine.

14. The controller of the work machine direct current power system of claim 13, wherein the first plurality of equipment installed on the front section of the work machine comprises a first traction motor and a second traction motor and the second plurality of equipment installed on the rear section of the work machine comprises a third traction motor and a fourth traction motor.

15. The controller of the work machine direct current power system of claim 14, wherein the first plurality of equipment installed on the front section of the work machine further comprises a front hydraulic pump configured to pressurize a hydraulic fluid in a front accumulator and the second plurality of equipment installed on the rear section of the work machine further comprises a rear hydraulic pump configured to pressurize a hydraulic fluid in a rear accumulator.

16. A direct current power system of a work machine, comprising:

a power system mode, wherein in the power system mode:
   a first bus connector is open to electrically disconnect a first direct current bus from a second direct current bus, thereby electrically disconnecting a first reactive load of the work machine from a second reactive load of the work machine;
   a second bus connector is closed to electrically connect a first battery bank of a power unit to the first direct current bus to provide power to the first reactive load of the work machine; and
   a third bus connector is closed to electrically connect a second battery bank of the power unit to the second direct current bus to provide direct current power to the second reactive load of the work machine; and a reduced power mode whereby a secondary battery provides direct current power, wherein in the reduced power mode:
   the first bus connector is closed to electrically connect the first direct current bus to the second direct current bus, wherein the secondary battery provides direct current power to a converter, and wherein the converter provides direct current power to the second direct current bus:
   the second bus connector open to electrically disconnect the first battery bank from the first direct current bus; and
   the third bus connector is open to electrically disconnect the second battery bank from the second direct current bus, wherein in the reduced power mode the secondary battery provides direct current power to the first reactive load and the second reactive load.

17. The direct current power system of claim 16, further comprising a charging mode to charge the first battery bank and the second battery bank using an external power source, wherein in the charging mode:

the first bus connector is closed to electrically connect the first direct current bus to the second direct current bus:

the second bus connector is closed to electrically connect the first battery bank of a power unit to the first direct current bus to provide power from the external power source to the first battery bank; and the third bus connector is closed to electrically connect the second battery bank of the power unit to the second direct current bus to provide power from the external power source to the first battery bank.

* * * * *